United States Patent [19]

Cenker et al.

[11] B 3,981,829
[45] Sept. 21, 1976

[54] PROCESS FOR THE PREPARATION OF CARBODIIMIDE-ISOCYANURATE FOAMS

[75] Inventors: Moses Cenker, Trenton; Thirumurti L. Narayan, Riverview; Peter T. Kan, Plymouth, all of Mich.

[73] Assignee: BASF Wyandotte Corporation, Wyandotte, Mich.

[22] Filed: Dec. 30, 1974

[21] Appl. No.: 537,102

[44] Published under the second Trial Voluntary Protest Program on January 13, 1976 as document No. B 537,102.

[52] U.S. Cl. .................. 260/2.5 AC; 260/2.5 BF; 260/2.5 AW
[51] Int. Cl.² ................ C08G 18/14; C08G 18/20
[58] Field of Search .......... 260/2.5 BF, 2.5 AW, 260/2.5 AC

[56] References Cited
UNITED STATES PATENTS

| | | | |
|---|---|---|---|
| 3,573,301 | 3/1971 | Winter | 260/2.5 AW |
| 3,620,986 | 11/1971 | Djehr et al. | 260/2.5 AW |
| 3,644,168 | 2/1972 | Bonk et al. | 260/2.5 AW |
| 3,645,923 | 2/1972 | Kan | 260/2.5 BF |
| 3,725,319 | 4/1973 | Frisch | 260/2.5 AJ |
| 3,748,289 | 7/1973 | Cenker et al. | 260/2.5 BF |
| 3,803,064 | 4/1974 | Fishbein et al. | 260/2.5 AW |
| 3,806,475 | 4/1974 | Narayan et al. | 260/2.5 BF |

*Primary Examiner*—H. S. Cockeram
*Attorney, Agent, or Firm*—Joseph D. Michaels; Bernhard R. Swick; Robert E. Dunn

[57] ABSTRACT

Rigid cellular foam compositions characterized by carbodiimide and isocyanurate linkages are prepared by catalytically condensing an organic polyisocyanate in the presence of a catalytically sufficient amount of a catalyst system comprising (a) an alkanolaminotriazine, (b) a hexahydrotriazine, and (c) phenol or a substituted phenol.

9 Claims, No Drawings

PROCESS FOR THE PREPARATION OF CARBODIIMIDE-ISOCYANURATE FOAMS

BACKGROUND OF THE INVENTION

1. Field of the Invention

The present invention relates to a novel catalyst system for the preparation of cellular foams characterized by carbodiimide and isocyanurate linkages. More particularly the invention relates to the use of a catalyst system comprising (a) an alkanolaminotriazine, (b) a hexahydrotriazine, and (c) phenol or a substituted phenol in the preparation of cellular foams characterized by carbodiimide and isocyanurate linkages.

2. Prior Art

The preparation of foams containing carbodiimide and isocyanurate linkages is well known in the art. The art teaches that foams containing both linkages can be prepared by condensing an organic polyisocyanate with a catalyst which promotes both carbodiimide and isocyanurate linkages or with a co-catalyst system, one catalyst promoting carbodiimide linkages and one catalyst promoting isocyanurate linkages. Representative of such teachings are the disclosures found in U.S. Pat. Nos. 3,645,923; 3,657,161; 3,717,596; 3,723,366; 3,746,709, and 3,806,475.

SUMMARY OF THE INVENTION

The present invention relates to an improved process for the preparation of carbodiimide-isocyanurate foams employing a catalytically sufficient amount of a catalyst system comprising (a) an alkanolaminotriazine, (b) a hexahydrotriazine, and (c) phenol or a substituted phenol. The polymerization times of organic polyisocyanates are significantly reduced when a phenol is employed along with the aforementioned triazine co-catalysts. In addition, because of the higher reactivity of the catalyst system the amount of catalysts required to polymerize the polyisocyanates is considerably reduced.

DESCRIPTION OF THE PREFERRED EMBODIMENTS

In accordance with the present invention rigid cellular foams are prepared by the catalytic condensation of an organic polyisocyanate in the presence of the aforementioned catalyst systems. The products which are produced in accordance herewith are rigid cellular foam plastics containing carbodiimide linkages and isocyanurate linkages. It is the carbodiimide linkages whose formation provides the carbon dioxide blowing agent and which together with the isocyanurate linkages imparts the excellent flame properties to the products.

As mentioned above, there are three essential ingredients which comprise the catalyst system of the present invention. One ingredient is an alkanolaminotriazine. Representative alkanolaminotriazine catalysts which are of use in the present invention include: 2,4,6-tris(diethanolamino)-s-triazine, 2,4,6-tris(diisopropanolamino)-s-triazine, 2,4,6-tris(dibutanolamino)-s-triazine, 2,4,6-tris(N-methylethanolamino)-s-triazine, and unsymmetrically substituted triazines of the formula:

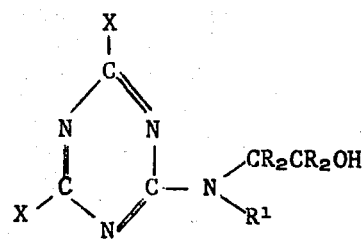

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy, alkyl of from 1 to 12 carbon atoms, phenyl, hydroxyl, halogen, aziridyl, pyrrolidyl, piperidyl, or N-alkylpiperazyl. Since the triazines are unsymmetrically substituted, it is apparent that each X cannot concurrently be

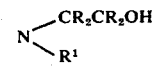

wherein each R and $R^1$ is the same.

Representative compounds from the above generic formula include:
  2-amino-4,6-bis(N-methyl-2-hydroxyethylamino)-1,3,5-triazine,
  2,4-bis(N-methyl-2-hydroxyethylamino)-6-methoxy-1,3,5-triazine,
  2,4-bis(di-2-hydroxyethylamino)-6-chloro-1,3,5-triazine,
  2,4-bis(N-methyl-2-hydroxyethylamino)-6-chloro-1,3,5-triazine,
  2,4-bis(N-methyl-2-hydroxyethylamino)-6-phenyl-1,3,5-triazine,
  2,4-bis(N-methyl-2-hydroxyethylamino)-6-diethylamino-1,3,5-triazine,
  2,4-bis(N-methyl-2-hydroxyethylamino)-6-dimethylamino-1,3,5-triazine,
  2,4-bis(di-2-hydroxyethylamino)-6-diethylamino-1,3,5-triazine,
  2,4-bis(di-2-hydroxyethylamino)-6-phenoxy-1,3,5-triazine,
  2,4-bis(N-methyl-2-hydroxyethylamino)-6-phenoxy-1,3,5-triazine,
  2,4-bis(N-methyl-2-hydroxyethylamino)-6-methyl-1,3,5-triazine,
  2,4-bis(di-2-hydroxyethylamino)-6-methyl-1,3,5-triazine,
  2,4-bis(N-methyl-2-hydroxyethylamino)-6-hydroxy-1,3,5-triazine,
  2,4-bis(diethylamino)-6-(N-methyl-2-hydroxyethylamino)-1,3,5-triazine,
  2,4-dimethoxy-6-(N-methyl-2-hydroxyethylamino)-1,3,5-triazine,
  2,4-bis(dimethylamino)-6-(N-methyl-2-hydroxyethylamino)-1,3,5-triazine,
  2,4-diphenoxy-6-(N-methyl-2-hydroxyethylamino)-1,3,5-triazine, and
  2,4-diphenoxy-6-(di-2-hydroxyethylamino)-1,3,5-triazine.

Generally, the amount of s-triazine catalyst employed in the process of the subject invention will be from 0.1 part to 10 parts per 100 parts of organic polyisocyanate.

The preparation of the triazine catalyst generally comprises condensing cyanuric chloride with the selected amine in the presence of a neutralizing amount of sodium hydroxide. Thus, for example, 2,4,6-tris(diethanolamino)-s-triazine is prepared from the condensation of diethanolamine and cyanuric chloride in the presence of a neutralizing amount of sodium hydroxide. The triazine compounds and their methods of preparation are known in the art and are more fully described by Kaiser et al., *Journal Of The American Chemical Society*, V. 73, p. 2984 (1951), as well as in U.S. Pat. No. 3,806,475.

The second ingredient of the catalyst system employed in the process of the present invention is a 1,3,5-tris(N,N-dialkylaminoalkyl)-s-hexahydrotriazine or the alkylene oxide and water adducts thereof. 1,3,5-Tris(N,N-dialkylaminoalkyl)-s-hexahydrotriazines are generally prepared by reacting equimolar amounts of a dialkylaminoalkylamine and a 37% aqueous solution of formaldehyde (formalin) at a temperature ranging from about 0°C. to 20°C., and at atmospheric pressure. More particularly, the amine and the formaldehyde are mixed together with gentle stirring at about 0°C. Thereafter, and with continuous gentle stirring the resulting mixture is allowed to heat up to room temperature. The hexahydrotriazine compound is then recovered by first salting out the hexahydrotriazine from the reaction mixture with a strong base, such as potassium hydroxide, and then purifying by distillation. These hexahydrotriazine compounds and their methods of preparation are more particularly described by Nicholas et al., *Journal of Cellular Plastics*, 1(1), 85 (1965), and Graymore, *Journal of the Chemical Society*, 1493 (1931).

Representative of the 1,3,5-tris(N,N-dialkylaminoalkyl)-s-hexahydrotriazines useful herein include, for example, 1,3,5-tris(N,N-dimethyl-2-aminoethyl)-s-hexahydrotriazine, 1,3,5-tris(N,N-dimethyl-2-aminopropyl)-s-hexahydrotriazine, and the like; 1,3,5-tris(N,N-diethyl-2-aminoethyl)-s-hexahydrotriazine, and the like; 1,3,5-tris(N,N-dipropyl-2-aminoethyl)-s-hexahydrotriazine, and the like; and so forth. The preferred compound is 1,3,5-tris(N,N-dimethyl-3-aminopropyl)-s-hexahydrotriazine which can also be designated as 1,3,5-tris(3-dimethylaminopropyl)-s-hexahydrotriazine.

Other preferred isocyanate trimerization catalysts, as noted, are the alkylene oxide and water adducts of the hereinbefore described 1,3,5-tris(N,N-dialkylaminoalkyl)-s-hexahydrotriazines. The alkylene oxides which may be used to prepare the adducts are, preferably, linear alkylene oxides, such as ethylene oxide, propylene oxide, the butylene oxides, and the pentylene oxides. Although not preferred, alicyclic oxides, such as cyclopentylene oxide, cyclohexylene oxide, and the like, can be used herein. Also, substituted alkylene oxides such as styrene oxide can be used herein. The preferred alkylene oxide, though, is propylene oxide. For a more comprehensive discussion of these adducts, reference is made to U.S. Pat. No. 3,746,709. Generally, from about 1 part to 6 parts by weight of catalyst based on 100 parts of polyisocyanate will be employed in the present invention.

The third ingredient of the catalyst system is phenol or a substituted phenol. Representative phenols which may be employed in the catalyst system of the present invention include phenol, monosubstituted phenols such as the o-, p- and m-substituted methylphenols, chlorophenols, bromophenols, fluorophenols, nitrophenols, methoxyphenols, hydroxyacetophenones, hydroxydiphenyls, hydroxybenzophenones, and hydroxydiphenylmethanes; disubstituted phenols such as the dichlorophenols, dibromophenols, dimethylphenols and dimethoxyphenols; trisubstituted phenols such as the trichlorophenols, tribromophenols and trimethylphenols; pentasubstituted phenols such as pentachlorophenol, pentabromophenol and pentafluorophenol; and polyhydric phenols such as catechol, resorcinol, hydroquinone, pyrogallol, hydroxyhydroquinone and phloroglucinol. Generally from about 0.01 part to 5.0 parts, preferably 0.5 part to 2.0 parts by weight of a phenol based on 100 parts of polyisocyanate will be employed in the process of the subject invention.

The organic polyisocyanate used to prepare the carabodiimide foam corresponds to the formula:

wherein $R''$ is a polyvalent organic radical which is either aliphatic, aralkyl, alkaryl, aromatic or mixtures thereof, and $z$ is an integer which corresponds to the valence of $R''$ and is at least 2. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, 2,4,6-toluene triisocyanates; the aromatic tetraisocyanates, such as 4,4'-dimethyldiphenylmethane-2,2'-5,5'-tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasi-prepolymers". These quasi-prepolymers are prepared by reacting an excess of organic polyisocyanate or mixtures thereof with a minor amount of an active hydrogen containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxy-terminated polyesters, polyalkylene ether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha,\beta$-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane1,2,6-triol, $\alpha$-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylene diamine.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithol, and alkynethiols such as 3-hexyne-1,6-dithiol.

Any suitable polyamine may be used including aromatic polyamines such as p-aminoaniline, 1,5-diaminonaphthalene, and 2,4-diaminotoluene; aliphatic polyamines such as ethylenediamine, 1,3-propylenediamine, 1,4-butylenediamine, and 1,3-butylenediamine, as well as substituted secondary derivatives thereof.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40°C. to 150°C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639 and 3,823,201.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541, and 3,639,542.

The foams of the present invention are prepared by mixing together the organic polyisocyanate and the catalysts at an initiating temperature which, depending on the catalysts will range from about 0°C. to 150°C. Under such conditions, carbon dioxide is generated, foam formation begins, and almost immediately an exotherm is developed within the reaction system.

The present invention also contemplates the incorporation of additional ingredients in the foam formulation to tailor the properties thereof. Thus, plasticizers such as tris(2-chloroethyl) phosphate and surfactants such as the silicone surfactants, e.g., alkylpolysiloxanes and polyalkyl siloxanes, may be employed in the invention. Further additional ingredients include auxiliary or supplemental blowing agents, such as water or halohydrocarbons, and inorganic fillers, pigments and the like can be used. In addition, polyols such as those described above in connection with the preparation of quasiprepolymers may be employed in the process of the subject invention. If a polyol is employed, a urethane-promoting catalyst may also be added to the formulation. Preferred urethane-promoting catalysts are the tin salts of carboxylic acids such as dibutyltin dilaurate and acetate.

It should also be pointed out that in certain instances the triazine is a solid at ambient conditions. Thus, it can be first dissolved in an ingredient such as a plasticizer, a surfactant or blowing agent, thereby providing an easy means for introducing the ingredients into the system.

In any event, the carbodiimide foams prepared in accordance herewith are rigid cellular products having a density of from about 1 pound to 40 pounds per cubic foot which exhibit excellent flame properties, such as fire resistance, low smoke evolution and excellent weight retention.

Following are specific, non-limiting examples which are provided to illustrate the enumerated principles described herein. All parts are by weight unless otherwise indicated. In the examples, the compressive strength properties of the foams were determined in accordance with ASTM-1621 and the friability properties by ASTMC-421. The flame retardant properties were determined by the Butler Chimney Test as described by Krueger et al, SPE 25th Antec., Vol. XIII, Detroit, Mich. 1967, pp. 1052–1057.

EXAMPLES 1–40

A series of foams was prepared by simultaneously adding a catalyst system to a reaction vessel equipped with a high speed stirrer to which had been charged a polyisocyanate and in certain cases a foam stabilizer, a plasticizer and/or a blowing agent. An exotherm was generated and foam formation followed soon after. Table I, below, illustrates the details of the preparations. Infrared spectroscopic analyses indicate that the foams exhibit carbodiimide and isocyanurate linkages. In the Tables, the following abbreviations are employed:

TDI — a mixture of 80/20 by weight 2,4-, 2,6-tolylene diisocyanate
PAPI — polymethylene polyphenyl isocyanate
TDH — 1,3,5-tris(N,N-dimethylaminopropyl)hexahydrotriazine
DMT — 2,4-bis(diethylamino)-6-N-methylethanolamino-s-triazine
TMT — 2,4,6-tris(N-methylethanolamino)-s-triazine
FYROL CEF — tris(2-chloroethyl) phosphate
DC-193 — polyalkyl siloxane-polyoxyalkylene copolymer, a foam stabilizer
F-113 — 1,1,2-trichloro-1,2,2-trifluoroethane
pbw. — parts by weight

TABLE I

| Example | Isocyanate Blend, pbw. | | Catalyst Blend, pbw. | | | | | | F-113 pbw. | Cream Time, sec. | Rise Time, sec. | Max. Temp. °C. |
|---|---|---|---|---|---|---|---|---|---|---|---|---|
| | PAPI | TDI | DMT | TMT | TDH | Phenol | FYROL CEF | DC-193 | | | | |
| 1 | 100 | — | 2.8 | — | 1.4 | — | 1.9 | 0.93 | 15 | 200 | 255 | 116 |
| 2 | 100 | — | 2.3 | —1.2 | 1.2 | 1.6 | 0.77 | 15 | 105 | 165 | 124 | |
| 3 | 100 | — | — | 2.8 | 1.4 | — | 1.9 | 0.93 | 15 | 125 | 240 | 125 |
| 4 | 100 | — | — | 2.3 | 1.2 | 1.2 | 1.6 | 0.77 | 15 | 60 | 120 | 138 |
| 5 | 90 | 10 | 2.6 | — | 1.3 | — | 1.7 | 0.86 | 15 | 145 | 230 | 136 |
| 6 | 90 | 10 | 2.2 | — | 1.1 | 1.1 | 1.5 | 0.72 | 15 | 63 | 105 | 141 |
| 7 | 90 | 10 | — | 2.6 | 1.3 | — | 1.7 | 0.86 | 15 | 92 | 195 | 132 |
| 8 | 90 | 10 | — | 2.2 | 1.1 | 1.1 | 1.5 | 0.72 | 15 | 47 | 95 | 145 |
| 9 | 80 | 20 | 2.4 | — | 1.2 | — | 1.6 | 0.80 | 15 | 120 | 205 | 143 |
| 10 | 80 | 20 | 2.0 | — | 1.0 | 1.0 | 1.3 | 0.67 | 15 | 55 | 90 | 155 |
| 11 | 80 | 20 | — | 2.4 | 1.2 | — | 1.6 | 0.80 | 15 | 76 | 160 | 138 |
| 12 | 80 | 20 | — | 2.0 | 1.0 | 1.0 | 1.3 | 0.67 | 15 | 40 | 75 | 147 |
| 13 | 70 | 30 | 2.2 | — | 1.1 | — | 1.5 | 0.74 | 15 | 100 | 170 | 147 |
| 14 | 70 | 30 | 1.8 | — | 0.9 | 0.9 | 1.2 | 0.61 | 15 | 55 | 90 | 155 |
| 15 | 70 | 30 | — | 2.2 | 1.1 | — | 1.5 | 0.74 | 15 | 65 | 130 | 143 |
| 16 | 70 | 30 | — | 1.8 | 0.9 | 0.9 | 1.2 | 0.61 | 15 | 36 | 65 | 164 |
| 17 | 100 | — | 5.3 | — | 2.7 | — | — | — | 15 | 210 | 280 | 125 |
| 18 | 100 | — | 5.1 | — | 2.5 | 0.4 | — | — | 15 | 128 | 165 | 139 |
| 19 | 100 | — | 3.6 | — | 1.8 | 0.6 | — | — | 15 | 132 | 165 | 142 |
| 20 | 100 | — | 4.0 | — | 2.0 | 2.0 | — | — | 15 | 78 | 100 | 148 |
| 21 | 90 | 10 | 5.3 | — | 2.7 | — | — | — | 15 | 135 | 185 | 143 |
| 22 | 90 | 10 | 5.1 | — | 2.5 | 0.4 | — | — | 15 | 88 | 110 | 152 |
| 23 | 90 | 10 | 3.6 | — | 1.8 | 0.6 | — | — | 15 | 95 | 120 | 153 |
| 24 | 90 | 10 | 4.0 | — | 2.0 | 2.0 | — | — | 15 | 53 | 70 | 150 |
| 25 | 80 | 20 | 5.3 | — | 2.7 | — | — | — | 15 | 105 | 140 | 155 |
| 26 | 80 | 20 | 4.4 | — | 2.2 | 0.4 | — | — | 15 | 85 | 93 | 162 |
| 27 | 80 | 20 | 3.6 | — | 1.8 | 0.6 | — | — | 15 | 73 | 85 | 171 |
| 28 | 80 | 20 | 4.0 | — | 2.0 | 2.0 | — | — | 15 | 44 | 55 | 177 |
| 29 | 70 | 30 | 5.3 | — | 2.7 | — | — | — | 15 | 90 | 120 | 172 |
| 30 | 70 | 30 | 4.4 | — | 2.2 | 0.4 | — | — | 15 | 67 | 80 | 177 |
| 31 | 70 | 30 | 3.0 | — | 1.5 | 0.5 | — | — | 15 | 75 | 90 | 174 |
| 32 | 70 | 30 | 3.5 | — | 1.8 | 1.8 | — | — | 15 | 43 | 50 | 181 |
| 33 | 50 | 50 | 5.3 | — | 2.7 | — | — | — | 15 | 72 | 90 | 178 |
| 34 | 50 | 50 | 3.2 | — | 1.6 | 0.3 | — | — | 15 | 62 | 80 | 193 |
| 35 | 50 | 50 | 2.4 | — | 1.2 | 0.4 | — | — | 15 | 67 | 75 | 195 |
| 36 | 50 | 50 | 3.5 | — | 1.8 | 1.8 | — | — | 15 | 37 | 43 | 198 |
| 37 | — | 100 | 5.3 | — | 2.7 | — | — | — | — | 20 | 25 | 182 |
| 38 | — | 100 | 1.9 | — | 1.0 | 0.2 | — | — | — | 30 | — | 217 |
| 39 | — | 100 | 1.8 | — | 0.9 | 0.3 | — | — | — | 20 | — | — |
| 40 | — | 100 | 2.0 | — | 1.0 | 1.0 | — | — | — | 15 | — | — |

EXAMPLES 41–52

A series of foams was prepared by simultaneously adding a catalyst system to a reaction vessel equipped with a high speed stirrer to which had been charged a polyisocyanate and in certain cases a foam stabilizer, a plasticizer and/or a blowing agent. An exotherm was generated and foam formation followed soon after. Table II, below, illustrates the details of the preparations. Infrared spectroscopic analyses indicate that the foams exhibit carbodiimide and isocyanurate linkages.

TABLE II

| Example | Isocyanate Blend, pbw. | | Catalyst Blend, pbw. | | | F-113 pbw. | Cream Time, sec. | Rise Time, sec. | Max. Temp. °C. |
|---|---|---|---|---|---|---|---|---|---|
| | PAPI | TDI | DMT | TDH | Phenol | | | | |
| 41 | 100 | — | 5.3 | 2.7 | — | 15 | 210 | 280 | 125 |
| 42 | 100 | — | 5.1 | 2.5 | 0.40 | 15 | 150 | 200 | 131 |
| 43 | 90 | 10 | 5.3 | 2.7 | — | 15 | 135 | 185 | 143 |
| 44 | 90 | 10 | 5.1 | 2.5 | 0.40 | 15 | 100 | 135 | 146 |
| 45 | 80 | 20 | 5.3 | 2.7 | — | 15 | 105 | 140 | 155 |
| 46 | 80 | 20 | 4.4 | 2.2 | 0.35 | 15 | 83 | 110 | 161 |
| 47 | 70 | 30 | 5.3 | 2.7 | — | 15 | 90 | 120 | 172 |
| 48 | 70 | 30 | 4.4 | 2.2 | 0.35 | 15 | 70 | 92 | 168 |
| 49 | 50 | 50 | 5.3 | 2.7 | — | 15 | 72 | 90 | 178 |
| 50 | 50 | 50 | 3.8 | 1.9 | 0.30 | 15 | 60 | 75 | 179 |
| 51 | — | 100 | 5.3 | 2.7 | — | — | 20 | 25 | 182 |
| 52 | — | 100 | 2.6 | 1.3 | 0.20 | — | 20 | 25 | 203 |

EXAMPLES 53–58

A series of foams was prepared by simultaneously adding a catalyst system to a reaction vessel equipped with a high speed stirrer to which had been charged a polyisocyanate and in certain cases a foam stabilizer, a plasticizer and/or a blowing agent. An exotherm was generated and foam formation followed soon after. Table III, below, illustrates the details of the preparations as well as some of the physical properties of the resulting foams. Infrared spectroscopic analyses indicate that the foams exhibit carbodiimide and isocyanurate linkages.

TABLE III

| Example | Isocyanate Blend pbw. | | Catalyst Blend, pbw. | | | | | F-113 pbw. | Density pcf. | Comp. Str. 10% Defl. psi. | Tumb. Friab. % Wt. Loss | Closed Cells % | Butler Chimney Test | | |
|---|---|---|---|---|---|---|---|---|---|---|---|---|---|---|---|
| | PAPI | TDI | DMT | TDH | Phenol | FYROL CEF | DC-193 | | | | | | % Wt. Ret. | Flame Ht. in. | Time to SX sec. |
| 53 | 300 | — | 10.8 | 5.4 | 0.9 | 8.6 | 4.3 | 90 | 1.96 | 24.3 | 71.5 | 98.7 | 94.0 | 3 | 10 |
| 54 | 300 | — | 8.6 | 4.3 | 1.4 | 7.1 | 3.6 | 90 | 1.96 | 30.2 | 71.9 | 99.9 | 96.6 | 4 | 10 |
| 55 | 270 | 30 | 9.1 | 4.5 | 0.7 | 7.1 | 3.6 | 75 | 2.19 | 39.0 | 64.8 | 101.2 | 95.7 | 3 | 10 |
| 56 | 270 | 30 | 8.6 | 4.3 | 1.4 | 7.1 | 3.6 | 75 | 2.20 | 36.4 | 66.7 | 100.6 | 96.1 | 3 | 10 |
| 57 | 240 | 60 | 7.2 | 3.6 | 0.6 | 5.7 | 2.9 | 75 | 1.89 | 30.2 | 83.1 | 102.8 | 96.2 | 3 | 10 |
| 58 | 240 | 60 | 6.9 | 3.4 | 1.1 | 5.7 | 2.9 | 75 | 2.14 | 34.9 | 73.0 | 100.5 | 95.9 | 3 | 10 |

EXAMPLE 59

A carbodiimide-isocyanurate foam was prepared in the manner described in the previous examples. The ingredients employed and amounts thereof as well as the physical properties of the resulting foam are as follows:

| Foam Formulation Ingredients | Parts by Weight |
|---|---|
| Polymethylene polyphenyl-isocyanate | 100 |
| Polyol prepared by reaction of propylene oxide with Mannich condensation product of formaldehyde, phenol and diethanolamine (hydroxyl number of 530, nitrogen content of 4.17% by weight) | 20 |
| DMT | 1.0 |
| TDH | 1.0 |
| Phenol | 1.0 |
| Silicone surfactant | 1.0 |
| Trichlorofluoromethane | 25.0 |
| Physical Properties Of Foam | |
| Density, core, pcf. | 1.86 |

| Foam Formulation Ingredients | Parts by Weight |
|---|---|
| Compressive strength, psi. at yield point | 21 |
| at 10% defl. | 21 |
| Tensile strength, psi. | 27 |
| K factor, BTU/(hr.)(ft.²)(°F./in.) | |
| initial | 0.118 |
| after 10 days at 140°F. | 0.151 |
| Friability | |
| Taber, cycles/in. | 268 |
| Tumbling, % wt. loss | 16 |
| Flammability | |
| Butler Chimney test | |
| % wt. retained | 86 |
| flame ht., in. | 7–8 |
| Bureau of Mines | |
| sec. to burn-through | 1209 |
| Simulated Service Conditions | |
| 158°F., 100% R.H., % volume change | |
| 1 day | 2.6 |
| 2 days | 3.0 |
| 7 days | 3.8 |
| 14 days | 4.1 |
| 28 days | 4.6 |

The embodiments of the invention in which an exclusive property or privilege is claimed are defined as follows:

1. A process for the preparation of a foam characterized by carbodiimide and isocyanurate linkages which comprises condensing an organic polyisocyanate in the presence of a catalyst system comprising based on 100 parts by weight of organic polyisocyanate
    a. from 0.1 part to 10 parts by weight of an s-triazine compound selected from the group consisting of 2,4,6-tris(diethanolamino)-s-triazine, 2,4,6-tris(-diisopropanolamino)-s-triazine, 2,4,6-tris(-dibutanolamino)-s-triazine, 2,4,6-tris(N-methylethanolamino)-s-triazine, and unsymmetrically substituted triazines of the formula:

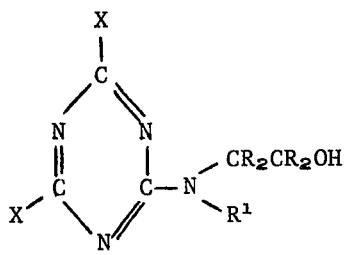

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy, alkyl of from 1 to 12 carbon atoms, phenyl, hydroxyl, halogen, aziridyl, pyrrolidyl, piperidyl, or N-alkylpiperazyl, b. from 1 part to 6 parts by weight of a 1,3,5-tris(N,N-dialkylaminoalkyl)-s-hexahydrotriazine or the alkylene oxide and water adducts thereof, and c. from 0.01 part to 5 parts by weight of a phenolic compound selected from the group consisting of phenol, methylphenols and halophenols.

2. The process of claim 1 wherein the organic polyisocyanate is selected from the group consisting of toluene diisocyanate, methylene diphenyl diisocyanate, polyphenyl polymethylene polyisocyanate and mixtures thereof.

3. The process of claim 1 wherein (c) is phenol.

4. The process of claim 1 wherein the s-triazine compound is 2,4,6-tris(N-methylethanolamino)-s-triazine.

5. The process of claim 1 wherein the s-triazine compound is 2,4-bis(diethylamino)-6-(N-methyl-2-hydroxyethylamino)-s-triazine.

6. The process of claim 1 wherein the hexahydrotriazine is 1,3,5-tris(N,N-dimethylaminopropyl)-s-hexahydrotriazine.

7. The process of claim 1 conducted in the presence of a fluorocarbon blowing agent.

8. The process of claim 1 conducted in the presence of tris(2-chloroethyl) phosphate.

9. The process of claim 1 conducted in the presence of a polyol.

* * * * *